April 10, 1951  J. G. KREER, JR  2,548,671
DIRECTIONAL RADIO RECEPTION
Filed June 16, 1949  4 Sheets-Sheet 1

INVENTOR
J. G. KREER, JR.
BY
ATTORNEY

April 10, 1951     J. G. KREER, JR     2,548,671
DIRECTIONAL RADIO RECEPTION
Filed June 16, 1949     4 Sheets-Sheet 3
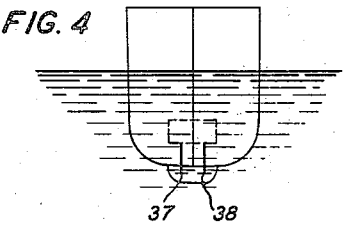
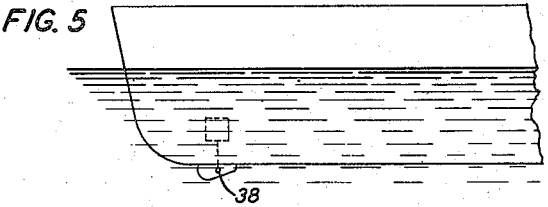
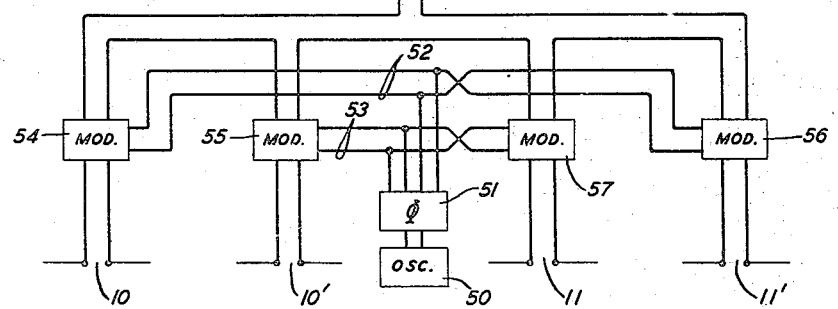
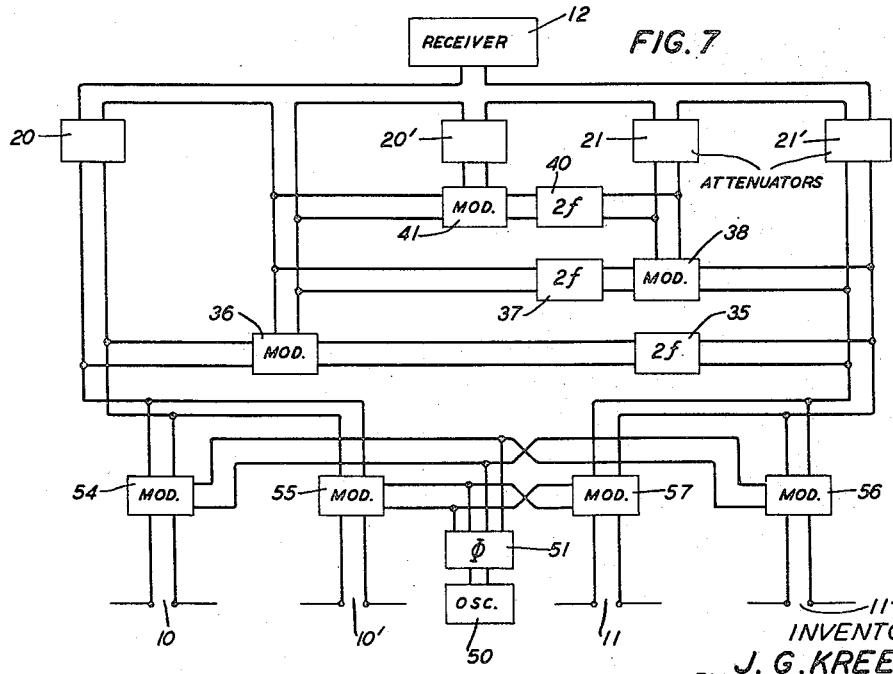
INVENTOR
J. G. KREER, JR.
BY
ATTORNEY Patented Apr. 10, 1951

2,548,671

UNITED STATES PATENT OFFICE 2,548,671

DIRECTIONAL RADIO RECEPTION

John G. Kreer, Jr., Bloomfield, N. J., assignor to Bell Telephone Laboratories, Incorporated, New York, N. Y., a corporation of New York Application June 16, 1949, Serial No. 99,487

10 Claims. (Cl. 343—119)

The present invention relates to the directional reception of wave energy including radio waves, sound waves, underwater compressional waves or other type.

An object of the invention is to increase the directivity effect of any given directive wave interceptor equipment such as an array of antennae or sound pick-up elements.

This object can be achieved by, and this is a further object of the invention, multiplying the amount of phase shift produced in the given interceptor equipment by causing certain interactions to take place between received wave components in a way to increase the directivity effect of the given interceptor equipment.

More specifically stated, it is an object of the invention to change a given phase difference between wave components as received into a greatly increased phase difference by causing such components to interact with each other to produce a series of components differentiated in phase from one another and obtaining from them a summation phase difference. In this way there can be obtained from a given amount of wave interceptor equipment a directivity pattern equivalent to that which has in the past required a much larger amount of interceptor equipment to produce. The equipment needed for increasing the phase difference by interaction between the wave components may take the form of electronic or equivalent circuits including harmonic generators and modulators together with filters. The justification for this equipment may be found in the much smaller amount of wave intercepting apparatus required and this will differ in different specific cases. In an installation where the wave intercepting parts (dipoles, piezo-electric crystals, microphones, or other intercepting elements) are mounted for rotation the matter of reducing this apparatus to, say, two wave intercepting elements in place of five or six or more elements, may be of great practical importance. In directive receivers in which the pick-up elements are stationary, such as large antennas for transatlantic reception, for example, the size of the antennas or the number of antennas in the array may be reduced at the relatively small cost of the added equipment for carrying out the present invention.

A common practice in building directive receiving devices, whether electromagnetic or acoustic, is to rely upon arrays of wave interceptors properly arranged in space and adjusted in amplitude to give the desired pattern. It is readily shown that in theory at least it is possible in this manner to produce any directive pattern which may be expanded in a double Fourier series in the two angle coordinates.

When, however, an attempt is made to reduce the result to practical designs, difficulties are encountered. In the first place if the desired pattern is such as to require an infinite series for its analytic expression, then an infinite number of doublets is required. In the second place, even though the desired pattern can be sufficiently well approximated by a finite number of terms of the series, it can be shown that the diameter of the array in any given plane, expressed in wavelengths, is approximately equal to $2\pi$ divided by the angular width of the beam in that plane.

The first of these difficulties leads to a large number of elements in which unavoidable variations in the spacings cause deviations of the resulting pattern from the computed pattern while the second leads to sizes of structure which may in the case of extremely narrow beams be greater than is feasible in the situation in which it is to be used. The latter difficulty is particularly evident in the case of acoustic pick-ups designed for underwater echo ranging where the size of the receiver is definitely limited by the size of a structure which may be extended below the hull of a ship and consequently the sharpness of the acoustic beam is correspondingly limited.

The present invention provides a method and means by which some of these difficulties may be minimized. The directivity of an array is obtained essentially from wave interceptors periodically spaced, so that the time of arrival of an impulse, or the phase angle of a sinusoidal wave varies from element to element by integral multiples of some function of the angle of approach. It has occurred to applicant that the same effect can be obtained provided only that we derive from the wave interceptors the basic unit of phase difference and provide in the receiving equipment means for multiplying or successively adding this basic unit. The basic unit may be produced by providing two wave intercepting elements at the unit spacing of the array. The multiplication of phase differences can be provided by a method of modulation in which the second harmonic of the output from one of the interceptors is introduced into a modulator as signal together with the output of the other interceptor as carrier. The lower sideband out of the modulator will then be a voltage of the same frequency, and if the circuit is adjusted for zero gain, the same amplitude as the original voltages but having a phase difference twice as great and hence corresponding to a third interceptor placed in the same line as the first two and with the same spacing. This process can then be repeated as often as may be necessary to produce the voltages corresponding to all of the elements in a linear array.

If the array required to produce a desired pattern is not linear but cubic, then four interceptors will be required to produce the basic phase differences corresponding to the three vector displacements. Also, if not all of the elements of a lattice are required in a given array, then some of the steps may be eliminated by using a multiplying process in which the $m$th harmonic of the output from one interceptor is introduced into the modulator together with the $(m-1)$ or $(m+1)$ harmonics of the other giving a phase difference of $\pm m$ times the basic unit.

The invention will be more fully understood from the following detailed description of illustrative embodiments thereof that are shown in the accompanying drawing in which:

Figs. 4 and 5 show application of the invention to underwater compressional wave transmission;

Fig. 6 shows a prior art type of array for including crossed dipoles for producing a directivity pattern similar to that obtained with the Fig. 1 array except that the pattern in the case of the Fig. 6 array is a figure of revolution or a three-dimensional pattern;

Fig. 7 is a schematic block diagram of an array in accordance with the invention for giving a solid directivity pattern in three dimensions, by use of two pairs of crossed dipoles, that is equivalent to the pattern requiring five pairs of crossed dipoles if connected in a prior art circuit amounting to an extension of circuit of Fig. 6;

Figure 1:
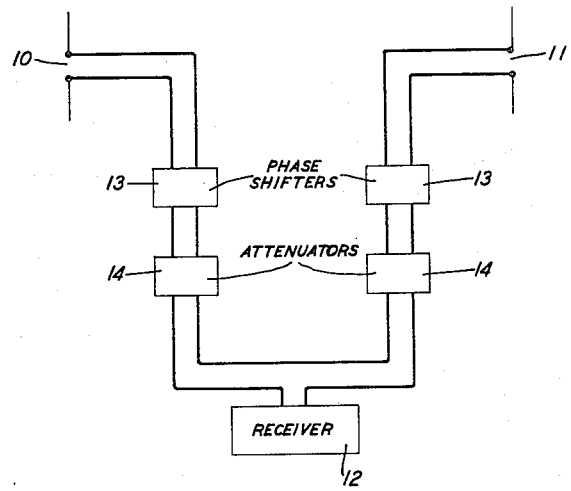
Figs. 1 and 2 show prior art antenna arrays with different directivity patterns.

In Fig. 1 two wave interceptors in the form of dipoles are shown at 10 and 11 connected in series relation with each other to a receiver 12. A phase shifter 13 and an attenuator 14 are shown connected between each dipole and the receiver. Without the elements 13 and 14 in the circuit, Fig. 1 would represent a broadside array, meaning that the receiver 12 would give its maximum response to waves which arrive at the two dipoles in the same phase. It has been common in the prior art to include the phase shifters 13 and attenuators 14 and to make them adjustable for the purpose of making the system exhibit greatest response for some different angle of arrival from broadside. By varying the elements 13, or elements 13 and 14 for instance, an effect equivalent to that of rotating the two dipoles together about a common axis midway between them is obtained. The elements 13, 14 have been shown in Fig. 1 merely to indicate that they may be used in cases where desired but they will not be indicated in the subsequent figures since their presence or absence has no special significance so far as this invention is concerned.

The use of only two dipoles as in Fig. 1 will not give a very sharply directive response with varying angles of incidence of waves being received. Its pattern is shown by the outermost curve A of Fig. 8 in which a polar plot is given between angle of the incident wave and relative field strength expressed in decibels.

Figure 2:
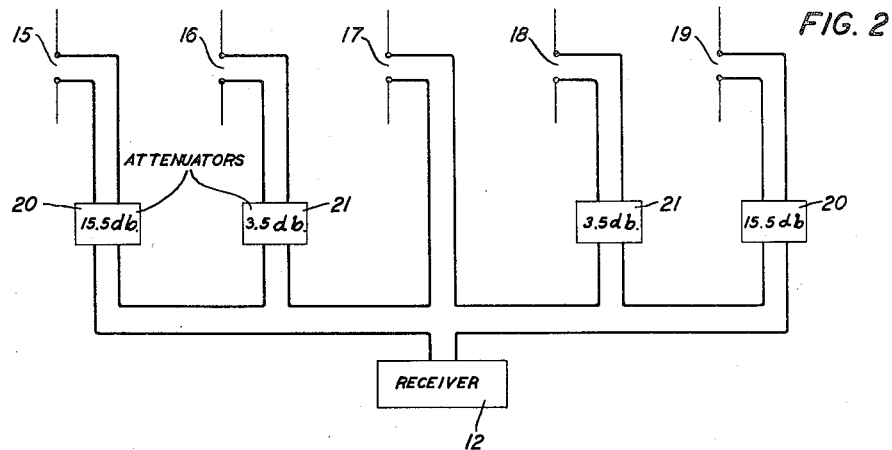
Figure 8:
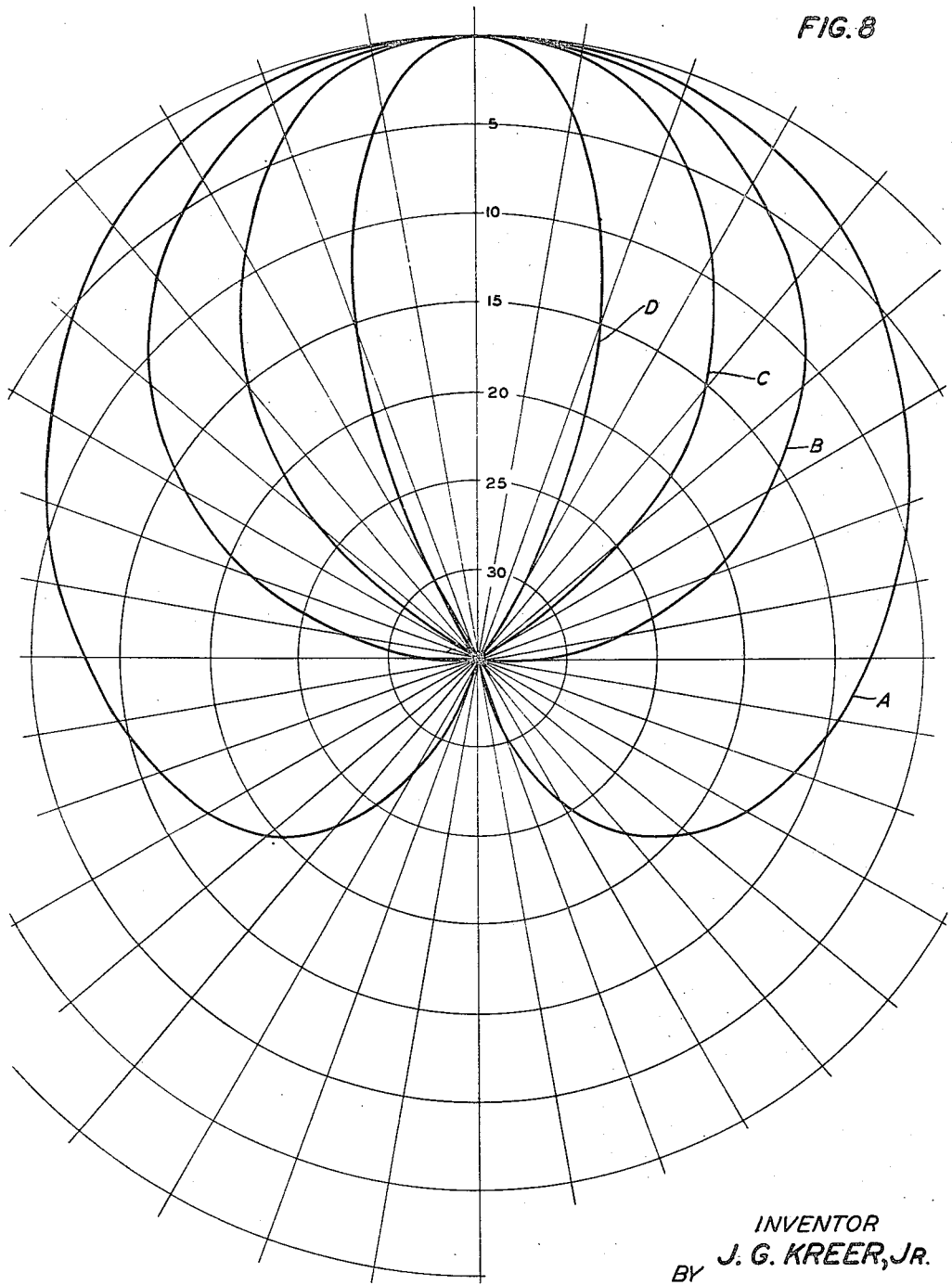
Fig. 8 shows types of directivity patterns obtained with different arrays as will be described.

The five-dipole prior art array of Fig. 2 will give a directivity pattern of the type of B, Fig. 8. It comprises the five equally spaced dipoles 15 to 19 arranged, for example, in a straight line and connected in series relation with the common receiver 12. In order to give strengths to the component currents varying from antenna to antenna in proportion to binomial coefficients the attenuators 20, 21 are connected in the leads from four of the dipoles, the remaining leads from the fifth dipole containing no attenuator. The attenuators 20, 20 are designed to introduce a loss of 15.5 decibels into their respective lines while the attenuators 21, 21 each introduces a loss of 3.5 decibels.

Figure 3:
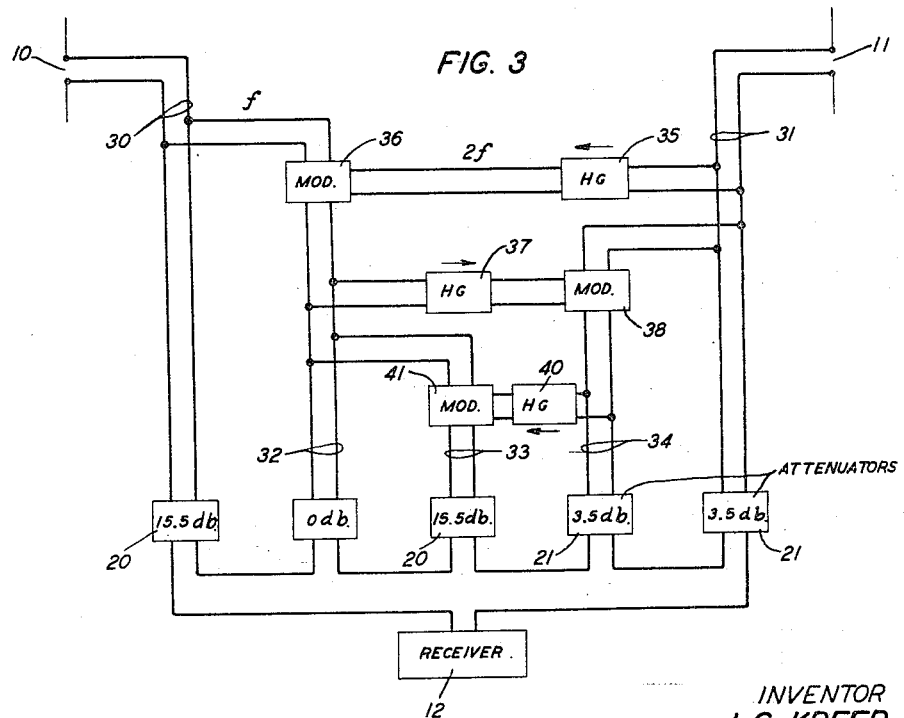
Fig. 3 is a schematic block diagram of an array in accordance with the present invention which with two dipoles will have an equivalent directivity to the five-dipole array of Fig. 2.

Fig. 3, which as stated gives an equivalent directivity pattern to that obtained with the array of Fig. 2, employs only two dipoles 10, 11 as in Fig. 1. Leads 30 and 31 from these respective dipoles are connected through respective attenuators 20, 20 to common receiver 12 in series relation with respect to each other. It will be noted that three other pairs of leads shown at 32, 33 and 34 are also connected to receiver 12 in series with the pairs of leads 30 and 31, and that two of these pairs of leads include attenuators and one pair has no attenuators, after the general plan of Fig. 2. The currents supplied over the pairs of leads 32, 33 and 34 instead of coming from other dipoles are derived from the currents received on dipoles 10 and 11 by suitable combining circuits.

Currents received on dipole 11 are multiplied in frequency in harmonic generator 35, for example they may be doubled in frequency, and the currents of double frequency are applied to the parallel branch of a push-pull modulator 36. The currents from dipole 10 are fed into the series branch of modulator 36. The lower sideband of the output modulated wave is selected and impressed on leads 32. Suitable filters are assumed to be included in the blocks representing the harmonic generator and the modulator for separating wanted from unwanted frequencies. If a given incoming radio wave of frequency $f$ has zero or reference phase as received on dipole 10 and has a phase of $b$ as received on dipole 11, the wave of double frequency impressed on the parallel branch of modulator 36 may be written $2f+2b$ and the wave that is impressed on the series branch is $f$. The lower sideband is then $2f+2b-f$ or $f+2b$ showing that a wave component exists in circuit 32 which is similar in characteristic to the wave that would be received on a third dipole spaced beyond dipole 11 by the unit separation distance if such a third dipole were actually present.

Some of the wave in circuit 32 having the form $f+2b$ is doubled in frequency in harmonic generator 37 and impressed on balanced modulator 38 together with some of the wave from dipole 11. The two waves applied to modulator 38 are, therefore, of the form $2f+4b$ and $f+b$ respectively. The lower sideband is selected from the output of the modulator, having the form $f+3b$ and this is impressed on receiver 12 over leads 34. This wave has a phase corresponding to the wave that would be received on the fourth antenna of the array if an array of the type shown in Fig. 2 were used.

Similarly, the wave $f+3b$ in circuit 34 is doubled in frequency at 40, becoming wave $2f+6b$, and is modulated by wave $f+2b$ on circuit 32 giving a lower sideband wave $f+4b$ which has the same phase as a wave that would be received on a fifth dipole of the array if present. In this way five waves are obtained from two dipoles, with the phase differences that would be exhibited by the five waves that are received in the leads from the five dipoles of Fig. 2, and are applied through respective attenuators 20, 21 to the common receiver 12. In the interest of simplification it has been assumed in this description that no changes in level result from the modulating and frequency multiplying processes but that the waves in the circuits 32, 33 and 34 as they exist at the modulator output are at the same level as the waves directly received in circuits 30 and 31 from the dipoles 10 and 11. With this assumption, the attenuators 20 and 21, or no attenuation in the case of circuit 32, can be used just as in the case of Fig. 2. Amplification or loss can be used in the various circuits where and to the extent necessary to arrive at the assumed level conditions.

In Figs. 4 and 5 a pair of underwater compressional wave interceptors are shown, to take the place of an array consisting of some larger number of pick-up elements but giving an equivalent directivity pattern when used with wave combining circuits according to this invention. These elements are shown at 37 and 38 as projecting from beneath a vessel in position to scan an underwater area and pick-up incident sound from any direction. These elements themselves may be of any suitable type such as microphones, piezoelectric crystals or the like. The circuit to which they are connected can have the same configuration as that of Fig. 3, the elements 37 and 38 replacing the dipoles 10 and 11. It will be understood that the frequencies involved may be widely different from those that may be typically employed in the radio circuit of Fig. 3 thus necessitating a circuit construction that will accommodate the utilized frequencies. Except for these differences the circuit employed in the installation of Figs. 4 and 5 is the same in construction and mode of operation as that of Fig. 3.

Fig. 7 illustrates the manner of applying the invention to the prior art solid angle directive receiver of the type indicated in Fig. 6. In both figures the same number of dipoles 10, 10', 11 and 11' are used but the circuit of Fig. 7 gives a directivity pattern equivalent to that which would require the use of five pairs of dipoles in the type of circuit shown in Fig. 6. The two doublets of the same pair at the same location, e. g. 10 and 10', are arranged at right angles to each other, and the two pairs are separated from each other a distance of one-quarter wavelength. A source 50 of beating oscillations is connected to feed beating waves through a phase shift network 51 to demodulators 54, 55, 56 and 57. The beating waves are applied in opposite phase to the demodulators of the same pair, such as 54, 56 and 55, 57 while a suitable phase difference, e. g. 90 degrees, exists between the two beating waves as they appear at the pairs of terminals on the output side of the phase shifter 51, connected respectively to circuits 52 and 53.

In the circuit of Fig. 6 the output currents from the modulators are applied in additive sense to the common receiver 12. The modulators are of the balanced or carrier-suppression type. The directivity pattern is of the A type, Fig. 8.

In Fig. 7, the output currents from the first pair of doublets 10, 10' are combined and carried to two branches, the first branch leading through attenuator 20 to the receiver 12 and the second branch leading to the series terminals of balanced modulator 36. This modulator has applied to its parallel or mid-branch terminals a wave of doubled frequency ($2f$) received from harmonic generator 35. The demodulated output of doubled elemental phase shift is applied directly to the receiver 12. Some of this same wave is doubled in frequency and then is beat against the wave from the second doublet 11, 11' in modulator 38, the output of which is applied through attenuator 21 to receiver 12. Some of the latter wave is doubled in frequency and beat against the demodulated output from modulator 36 in modulator 41, from which the demodulated output is applied through attenuator 20' to receiver 12. The waves received on the doublets 11 and 11' are combined and fed to the receiver 12 through attenuator 21'. As in the case of Fig. 3, the attenuators are proportioned to weight the various waves applied to receiver 12 in accordance with binomial coefficients. The directivity pattern obtained by the circuit of Fig. 7 is of the B type, Fig. 8. Patterns C and D show the effects obtainable by adding together 10 and 50 waves, respectively, derived as a result of combining the outputs from only two antennae to give phase multiplication in the manner disclosed in Fig. 3 or Fig. 7. If the method disclosed in Fig. 2 were used, the number of antennae required for these same types of directivity patterns (C and D) would be 10 and 50 antennae respectively.

Figure 9:
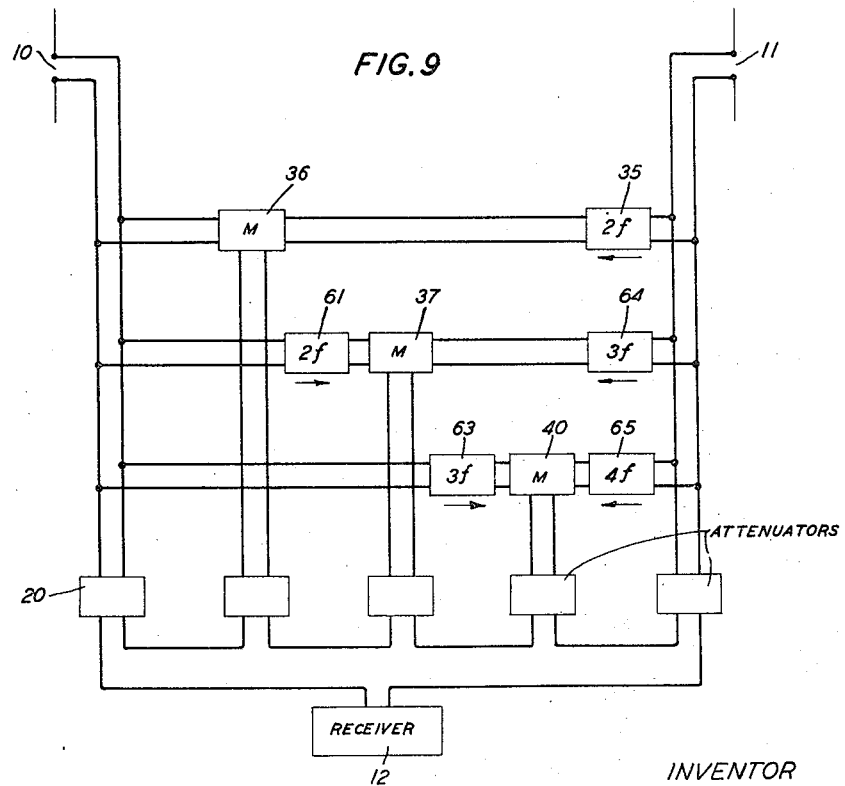
Fig. 9 is a schematic circuit diagram of a modified form of receiver according to the invention.

In Fig. 9 a type of connection for securing a series of wave components of increasing phase displacement is shown which may be considered as alternative to that shown in Fig. 3. Here, instead of doubling the waves of increased phase displacement appearing in the outputs of the modulator circuits, such as 36, the multiplication of frequency is carried to higher factors than two and the waves applied to the multipliers are taken directly from the respective wave interceptors. Such multipliers are shown at 61 and 63 for waves from dipole 10, with factors of two and three respectively, and at 64 and 65, besides 35, for waves from dipole 11 with factors of three and four respectively. In this way two separate series of harmonics are produced, and each of the harmonics in one series is modulated against the harmonic of next lower frequency in the other series, to obtain a succession of waves of increasing phase displacement.

Various modifications of the fundamental principle disclosed here may be made within the scope and spirit of the invention.

What is claimed is:

1. The method of increasing the directivity of a receiver comprising receiving an incident wave at two points in different phase, doubling the frequency of the wave as received at one point, modulating the wave of doubled frequency by the wave as received at the other point to obtain a wave having the same frequency as the received wave but shifted in phase with respect thereto, and utilizing said wave of shifted phase to determine the angle of incidence of the received wave.

2. In a directive receiver, a pair of wave energy interceptors, means comprising a frequency multiplier for deriving from one interceptor a wave whose frequency is an integral multiple of the frequency of the incident wave, means for deriving from the other interceptor a wave which differs in frequency from the wave of multiple frequency by the frequency of the incident wave, means for subtracting one derived wave from the other derived wave to obtain a wave of the incident wave frequency and of a phase which is a function of the angle of incidence of the received wave, and means to utilize said obtained wave to produce an indication of said angle of incidence.

3. In a directive signal wave receiver, a pair of wave interceptors for receiving waves from a distant point in different phase with respect to each other, a harmonic generator connected to receive waves incident upon one interceptor, a modulator for combining a wave of multiple frequency from the output of said harmonic generator against waves incident upon the second interceptor to produce a wave of the signal frequency but with an increased phase difference relative to the wave received on the first interceptor, a receiver, and means to impress said wave of increased phase difference on said receiver.

4. In a directional wave receiver, a first wave interceptor, a second wave interceptor spaced therefrom, means to receive from the first interceptor a wave having an incremental phase shift with respect to the wave received from the second interceptor, means to double the frequency of the first received wave and means to subtract from the doubled-frequency wave the second received wave whereby a wave is produced having twice said incremental phase shift with respect to the second received wave, and means to utilize said produced wave to increase the directivity effect of said interceptors.

5. The combination defined in claim 4 including further a means for doubling the frequency of the wave of the two-fold incremental phase shift and subtracting therefrom the wave received from the first interceptor.

6. In a directional wave receiver, a receiver element, a first wave interceptor for receiving a wave of frequency $f$ at phase zero, a second wave interceptor for receiving a wave of frequency $f$ at phase $b$, means to multiply the frequency of the second wave to produce a wave $2f+2b$, means to subtract therefrom the first wave to yield a wave $f+2b$, and means to impress the waves $f$, $f+b$ and $f+2b$ together on the receiver element.

7. The combination claimed in claim 6 including further, means to double the frequency of the wave $2f+2b$, means to subtract from the resultant wave the wave $f+b$ to produce a wave $f+3b$, and means to apply said last wave to said receiver element.

8. Means for securing a desired degree of azimuthal directivity from a pair of spaced antenna elements comprising a first plurality of harmonic generators connected to one of said spaced elements and arranged to produce successively higher harmonics of the input to said element, a second plurality of harmonic generators connected to the other of said spaced elements and arranged serially to produce successively higher harmonics of the input to the other of said spaced antenna elements, means for modulating each harmonic produced by the first plurality of harmonic generators by the next lower harmonic from the second plurality of harmonic generators, and means for applying the modulated harmonics in combination to a receiver.

9. Means for securing a desired degree of three-dimensional directivity from an antenna array utilizing four non-coplanar elements, comprising a plurality of series of generators arranged to produce successively higher harmonics of the input to each of said elements, means for modulating successive harmonics produced by one of said series of generators by the next lower of the successive harmonics produced by another of said series of generators, means for combining the resultants of successively modulated harmonics from coplanar antenna elements with modulated harmonics developed from an antenna element non-coplanar with said coplanar elements, and means for applying the signals in combination to a receiver.

10. Means for producing an antenna radiation pattern of desired directivity from an array having a restricted number of elements, comprising a series of generators of successively higher harmonics of an incoming signal connected to each of said elements, means for modulating a harmonic from each generator of one series onto the next higher harmonic of another series, and means for combining the modulated outputs from the generators of said series in a receiver.

JOHN G. KREER, JR.

REFERENCES CITED

The following references are of record in the file of this patent:

UNITED STATES PATENTS

| Number | Name | Date |
|---|---|---|
| 2,484,824 | Hansel | Oct. 18, 1949 |

FOREIGN PATENTS

| Number | Country | Date |
|---|---|---|
| 577,453 | Great Britain | May 20, 1946 |